United States Patent
Kim (10) Patent No.: US 11,932,217 B2
(45) Date of Patent: Mar. 19, 2024

(54) VALVE BLOCK FOR HYDRAULIC BRAKE SYSTEM

(71) Applicant: HL MANDO CORPORATION, Gyeonggi-do (KR)

(72) Inventor: Eun Mi Kim, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 598 days.

(21) Appl. No.: 17/267,296

(22) PCT Filed: Aug. 2, 2019

(86) PCT No.: PCT/KR2019/009686
§ 371 (c)(1),
(2) Date: Feb. 9, 2021

(87) PCT Pub. No.: WO2020/032495
PCT Pub. Date: Feb. 13, 2020

(65) Prior Publication Data
US 2021/0316708 A1    Oct. 14, 2021

(30) Foreign Application Priority Data
Aug. 9, 2018 (KR) .......................... 10-2018-0092952

(51) Int. Cl.
*B60T 8/36* (2006.01)
*B60T 15/02* (2006.01)
(Continued)

(52) U.S. Cl.
CPC ............ *B60T 15/028* (2013.01); *B60T 17/02* (2013.01); *B60T 17/04* (2013.01); *B60T 17/221* (2013.01); *B60T 2270/88* (2013.01)

(58) Field of Classification Search
CPC ........ B60T 15/028; B60T 17/02; B60T 17/04; B60T 17/221; B60T 2270/88
(Continued)

(56) References Cited

U.S. PATENT DOCUMENTS 9,428,165 B1 *   8/2016   Kim ...................... B60T 17/043
10,723,339 B2 *  7/2020   Kim ...................... B60T 8/4872
(Continued)

FOREIGN PATENT DOCUMENTS

DE   10 2008 037 047    11/2009
DE   10 2014 209 414    11/2015
(Continued)

OTHER PUBLICATIONS

International Search Report for PCT/KR2019/009686 dated Nov. 22, 2019 and its English translation from WIPO (now published as WO 2020/032495).
(Continued)

*Primary Examiner* — Christopher P Schwartz
(74) *Attorney, Agent, or Firm* — Ladas & Parry, LLP (57) ABSTRACT

The present disclosure relates to a valve block for a hydraulic brake system. The valve block for a hydraulic brake system includes a first valve row in which NO valve receiving bores to receive a plurality of NO valves are disposed, a second valve row in which NC valve receiving bores to receive a plurality of NC valves are disposed, a pair of pump receiving bores formed symmetrically to each other on opposite side surfaces to be disposed between the first and second valve rows and receiving a piston pump, a pair of first damping bores formed symmetrically to each other on the opposite side surfaces to be disposed above the first valve row and receiving a first pressure pulsation reducing device, a pair of second damping bores formed symmetrically to each other on an upper surface to be disposed above (Continued)

the first damping bores and receiving a second pressure pulsation reducing device, a pair of low pressure accumulator receiving bores formed symmetrically to each other on a lower surface, and a pressure sensor receiving bore formed on a front surface to be disposed adjacent to the pair of low pressure accumulator receiving bores.

15 Claims, 3 Drawing Sheets

(51) Int. Cl.
*B60T 17/02* (2006.01)
*B60T 17/04* (2006.01)
*B60T 17/22* (2006.01)

(58) Field of Classification Search
USPC .................. 303/116.1, 119.3; 137/861, 884
See application file for complete search history.

(56) References Cited

U.S. PATENT DOCUMENTS

| | | | |
|---|---|---|---|
| 10,793,129 B2* | 10/2020 | Kim | B60T 13/145 |
| 2004/0160120 A1 | 8/2004 | Weh et al. | |
| 2011/0062776 A1* | 3/2011 | Fischbach-Borazio | B60T 8/368 303/116.1 |
| 2013/0319562 A1* | 12/2013 | Weh | F15B 13/0803 137/884 |
| 2015/0298675 A1* | 10/2015 | Mayr | B60T 8/368 92/169.1 |
| 2017/0021814 A1 | 1/2017 | Schumann et al. | |

FOREIGN PATENT DOCUMENTS

| | | |
|---|---|---|
| DE | 10 2017 204 959 | 9/2017 |
| JP | 2001-124005 | 5/2001 |
| KR | 10-2011-0014204 | 2/2011 |
| KR | 10-2017-0008752 | 1/2017 |
| KR | 10-2017-0111310 | 10/2017 |

OTHER PUBLICATIONS

Written Opinion of the International Searching Authority for PCT/KR2019/009686 dated Nov. 22, 2019 and its English translation from WIPO (now published as WO 2020/032495).

International Preliminary Report on Patentability for PCT/KR2019/009686 dated Feb. 9, 2021 and its English translation from WIPO (now published as WO 2020/032495).

Office Action dated Nov. 29, 2021 for German Patent Application No. 11 2019 004 003.0 and its English machine translation by Google Translate.

* cited by examiner

VALVE BLOCK FOR HYDRAULIC BRAKE SYSTEM

CROSS-REFERENCE TO RELATED APPLICATIONS

This application is the U.S. National Stage of International Patent Application No. PCT/KR2019/009686 filed on Aug. 2, 2019, which claims the priority to Korean Patent Application No. 10-2018-0092952 filed in the Korean Intellectual Property Office on Aug. 9, 2018, the entire contents of which are incorporated herein by reference.

TECHNICAL FIELD

The present disclosure relates to a valve block for a hydraulic brake system, and more particularly, to a valve block for a hydraulic brake system for electronically controlling a braking pressure.

BACKGROUND ART

Typically, a hydraulic brake system includes a valve block in which a plurality of solenoid valves for controlling a braking hydraulic pressure transferred to a wheel cylinder provided on each wheel, a low pressure accumulator for temporarily storing oil exiting from the wheel cylinder, a pump for pumping oil stored in the low pressure accumulator or a master cylinder and a motor for driving the pump, a shuttle valve and a driving force control valve provided on a suction side and a discharge side of the pump, respectively, to control the flow of oil are installed, and an electronic control unit (ECU) for controlling electrically operated components.

The plurality of solenoid valves is divided into a normally open type (NO type) solenoid valve (hereinafter referred to as 'NO valve') connected to an upstream side of the wheel cylinder to control the transfer of hydraulic pressure to the wheel cylinder, and a normally closed type (NC type) solenoid valve (hereinafter referred to as 'NC valve') connected to a downstream side of the wheel cylinder to control the exiting of hydraulic pressure from the wheel cylinder.

The shuttle valve (ESV) is operated by being opened according to an open signal while maintaining a normally closed state, and oil in the master cylinder is guided to be sucked into an inlet of the pump according to the opening and closing operation of the shuttle valve.

The driving force control valve (TC NO valve) closes a flow path when road slip of the wheel occurs due to sudden start of a vehicle, etc. while maintaining a normally open state, so that the braking pressure generated by the driving of the pump may be transferred to the wheel cylinder of each wheel.

In order to install multiple parts compactly, a valve receiving bore for receiving the plurality of valves, a pump receiving bore and a motor receiving bore, a low pressure accumulator receiving bore, a connection portion for connecting the master cylinder and wheel cylinder, and a pressure sensor receiving bore for measuring the pressure in the master cylinder are machined on the valve block. A plurality of flow paths that is connected to each connection portion and receiving bore to control a flow direction of hydraulic pressure is also machined on the valve block.

The hydraulic brake system may further include damping devices for receiving a pressure pulsation reducing device for reducing pressure pulsation generated when hydraulic pressure of brake oil discharged from the pump is formed at high pressure so that the hydraulic pressure with reduced pressure pulsation is selectively transferred to the wheel cylinder or the suction side of the pump, or may adopt various structures such as providing an orifice portion in an outlet port through which oil is discharged through the damping device. For example, a conventional damping device attenuates the pressure pulsation caused by the pressure of oil discharged from the pump by including a damping space, a spring provided in the damping space, a piston elastically supported by the spring, a sealing member for sealing the damping space from the outside, and the like.

However, because the flow path structure in the valve block is changed when a damping device is provided in the valve block, interchange between the valve block provided with the damping device and the valve block without the damping device is difficult.

In addition, because the overall structure of the valve block becomes complicated when the damping device as described above is installed, in addition to difficulties in the process, the size of the valve block increases to adopt all complex structures, thereby requiring a lot of cost.

DISCLOSURE

Technical Problem

The present disclosure is directed to providing a valve block for a hydraulic brake system capable of implementing with the same flow paths even when a damping device for damping pressure pulsation generated depending on the pressure of oil discharged from a pump is additionally installed so that interchange with a valve block in which the damping device is not installed is possible.

The present disclosure is directed to providing a valve block for a hydraulic brake system capable of minimizing the size of the valve block by compactly configuring the structure inside the valve block.

Technical Solution

An aspect of the present disclosure provides a valve block for a hydraulic brake system including a first valve row in which NO valve receiving bores to receive a plurality of NO valves are disposed, a second valve row in which NC valve receiving bores to receive a plurality of NC valves are disposed, a pair of pump receiving bores formed symmetrically to each other on opposite side surfaces to be disposed between the first and second valve rows and receiving a piston pump, a pair of first damping bores formed symmetrically to each other on the opposite side surfaces to be disposed above the first valve row and receiving a first pressure pulsation reducing device, a pair of second damping bores formed symmetrically to each other on an upper surface to be disposed above the first damping bores and receiving a second pressure pulsation reducing device, a pair of low pressure accumulator receiving bores formed symmetrically to each other on a lower surface, a pressure sensor receiving bore formed on a front surface to be disposed adjacent to the pair of low pressure accumulator receiving bores, and a first hydraulic pressure line connecting a discharge side of the pump receiving bore and a suction side of the first damping bore, and a discharge side of the first damping bore and a bottom surface of the second damping bore in one straight line to transfer hydraulic pressure.

The first damping bore and the second damping bore may be provided to operate under different pressure conditions.

The valve block may further include orifice bores formed symmetrically to each other on the opposite side surfaces to be disposed between the first damping bores and the second damping bores, wherein the first hydraulic pressure line may connect the discharge side of the first damping bore, the orifice bore, and the bottom surface of the second damping bore in one straight line to transfer hydraulic pressure.

The valve block may further include a pair of driving force control valve receiving bores formed symmetrically to each other on the front surface to be disposed above the first valve row, and shuttle valve receiving bores formed symmetrically to each other on the front surface to be disposed between the first valve row and the second valve row, wherein an outlet of the orifice bore may be connected to the driving force control valve receiving bore.

The pair of first damping bore may be formed adjacent to a rear surface to be disposed between the first valve row and a valve row in which the pair of driving force control valve receiving bores are formed.

The valve block may further include a master cylinder connection portion formed on the rear surface and a wheel cylinder connection portion formed on the upper surface.

The valve block may further include a second hydraulic pressure line connecting the master cylinder connection portion, the driving force control valve receiving bore, and the shuttle valve receiving bore to transfer hydraulic pressure, wherein the second hydraulic line may be disposed between the NO valve receiving bores arranged in the first valve row.

The second hydraulic line may connect the pressure sensor receiving bore and the shuttle valve receiving bore to transfer hydraulic pressure.

The valve block may further include a motor receiving bore and a motor connector receiving bore formed on a rear surface and in which a motor for driving the piston pump and a motor connector are installed, wherein the motor receiving bore may be disposed to be oriented vertically between the pair of pump receiving bores.

The motor connector receiving bore may be disposed above the motor receiving bore, and the motor receiving bore and the motor connector receiving bore may be arranged in one line on a center line based on the center line crossing the upper surface and the lower surface.

The valve block may further include at least one motor ventilation hole formed in the motor receiving bore.

The valve block may further include a leak bore disposed between the pair of low pressure accumulator receiving bores, and a third hydraulic line disposed between the pair of low pressure accumulator receiving bores to connect the leak bore and the pump receiving bore.

The motor receiving bore may include a sensor bore to detect the position of a piston in the pump receiving bore, and the sensor bore may be disposed between the first and second valve rows to receive a converter to convert a position value into a rotation signal or convert the rotation signal into the position value.

The valve block may further include a fourth hydraulic line connecting the pressure sensor receiving bore and the NC valve receiving bore to transfer hydraulic pressure, wherein the fourth hydraulic line may be formed to penetrate the lower surface.

The valve block may further include a pair of vibration damper bores formed symmetrically to each other on a rear surface to be disposed between the pump receiving bore and the low pressure accumulator receiving bore, and a fifth hydraulic line connecting a discharge side of the low pressure accumulator receiving bore and a suction side of the pump receiving bore to transfer hydraulic pressure, wherein the vibration damper bores may be connected to the fifth hydraulic line.

Advantageous Effects

A valve block for a hydraulic brake system according to an embodiment of the present disclosure can implement as the same flow paths regardless of whether or not a damping device is installed, thereby improving compatibility between products having the same size without increasing the size.

The valve block for a hydraulic brake system according to an embodiment of the present disclosure can optimize the size of the valve block by utilizing unused spaces in the valve block, thereby reducing a manufacturing cost.

MODE OF THE DISCLOSURE

Hereinafter, an embodiment of the present disclosure will be described in detail with reference to the accompanying drawings. The following embodiments are provided to fully convey the spirit of the present disclosure to a person having ordinary skill in the art to which the present disclosure belongs. The present disclosure is not limited to the embodiments shown herein but may be embodied in other forms. The drawings are not intended to limit the scope of the present disclosure in any way, and the size of components may be exaggerated for clarity of illustration.

Figure 1:
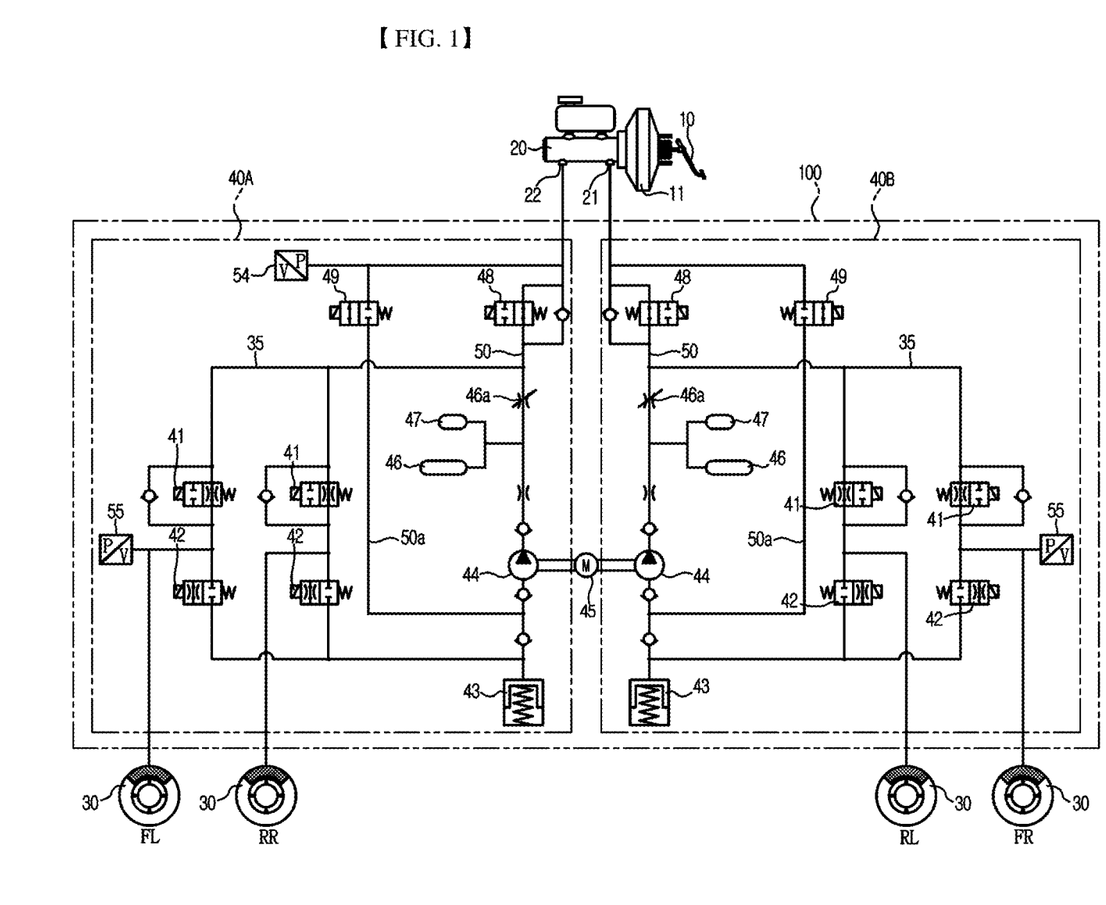
FIG. 1 is a hydraulic circuit diagram schematically showing a hydraulic brake system according to an embodiment.

FIG. 1 is a hydraulic circuit diagram schematically showing a hydraulic brake system according to an embodiment.

Referring to FIG. 1, a hydraulic brake system includes a brake pedal 10 to receive an operating force of a driver, a brake booster 11 to boost the pedal effort by using a pressure difference between a vacuum pressure and an atmospheric pressure caused by the pedal effort of the brake pedal 10, a master cylinder 20 in which pressure is generated by the brake booster 11, a first hydraulic circuit 40A in which a first port 21 of the master cylinder 20 and a wheel cylinder 30 provided on each of two wheels are connected to control transfer of hydraulic pressure, and a second hydraulic circuit 40B in which a second port 22 of the master cylinder 20 and the wheel cylinder 30 provided on each of the remaining two wheels are connected to control transfer of hydraulic pressure. The first hydraulic circuit 40A and the second hydraulic circuit 40B are compactly installed in a modulator block 40.

The first hydraulic circuit 40A and the second hydraulic circuit 40B each include solenoid valves 41 and 42 for controlling a braking hydraulic pressure transferred to the two wheel cylinders 30, a low pressure accumulator 43 for temporarily storing brake oil exiting from the wheel cylinders 30, a piston pump 44 for sucking and pumping brake oil exiting from the wheel cylinders 30 or oil in the master cylinder 20, a motor 45 for driving the piston pump 44, first and second pulsation reducing devices 46 and 47 having orifices 46a disposed on an outlet side to reduce pressure pulsation of oil discharged by the operation of the piston pump 44, a driving force control valve 48 and a shuttle valve 49 for controlling the flow of oil, hydraulic flow paths 50 and 50a connected such that the hydraulic pressure discharged from the first and second pulsation reducing devices 46 and 47 or the hydraulic pressure generated from the master cylinder 20 is selectively transferred to the wheel cylinder 30 or a suction side of the piston pump 44, and a port connection flow path 35 to connect the orifice 46a and the driving force control valve 48.

The port connection flow path 35 is connected to the wheel cylinder 30 of each of the wheels (FL, FR, RL, and RR) through the NO valves 41 and the NC valves 42. That is, in the hydraulic brake system as described above, pressure pulsation generated by the hydraulic pressure pumped from the piston pump 44 by the operation of the motor 45 during braking, and thus according to the present embodiment, in order to reduce the pressure pulsation, the pulsation reduction devices 46 and 47 connected to a discharge end of the piston pump 44 of each of the hydraulic circuits 40A and 40B are provided.

A cylinder pressure sensor may be provided for measuring the hydraulic pressure generated from the master cylinder 20. In addition, a pair of wheel pressure sensors for detecting the hydraulic pressure transferred to the wheel cylinder 30 may be provided on the cylinder pressure sensor and the two hydraulic circuits 40A and 40B, respectively.

Figure 2:
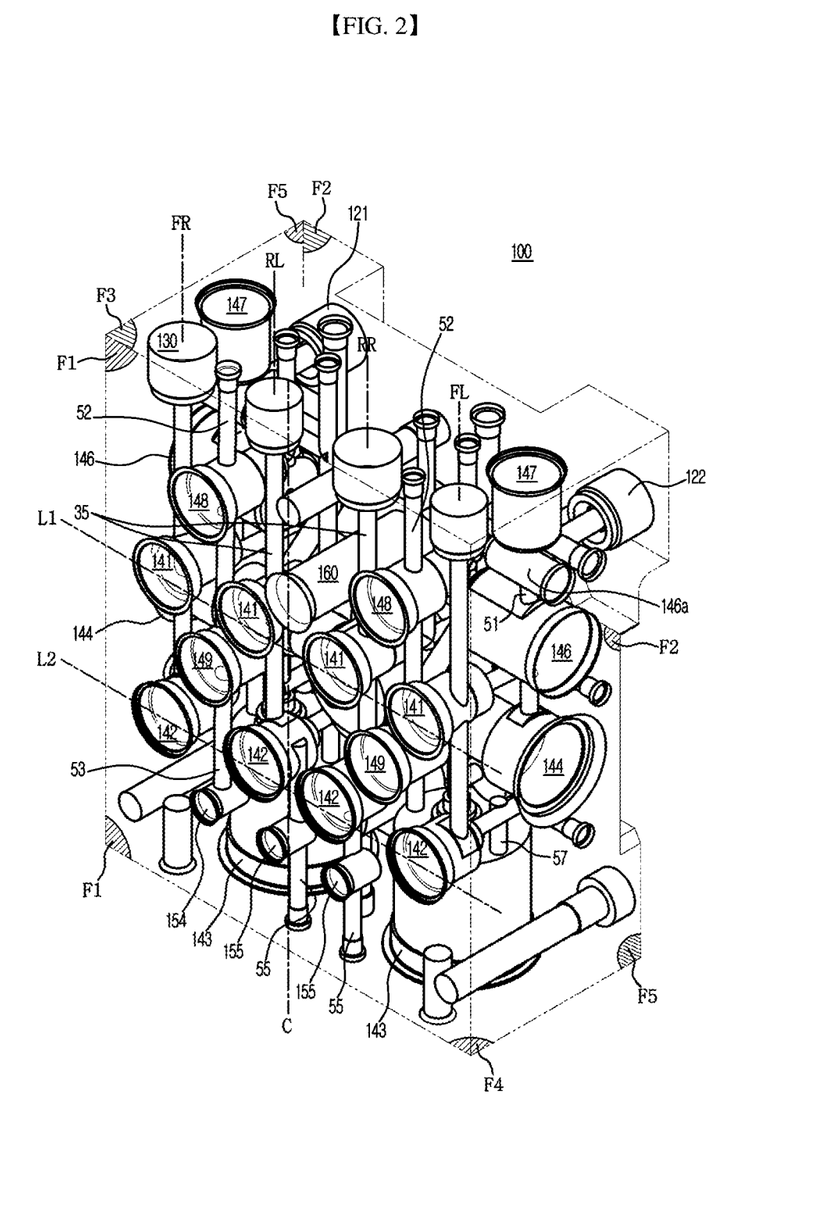
FIG. 2 is a perspective view showing a front surface of a valve block for the hydraulic brake system according to an embodiment.
Figure 3:
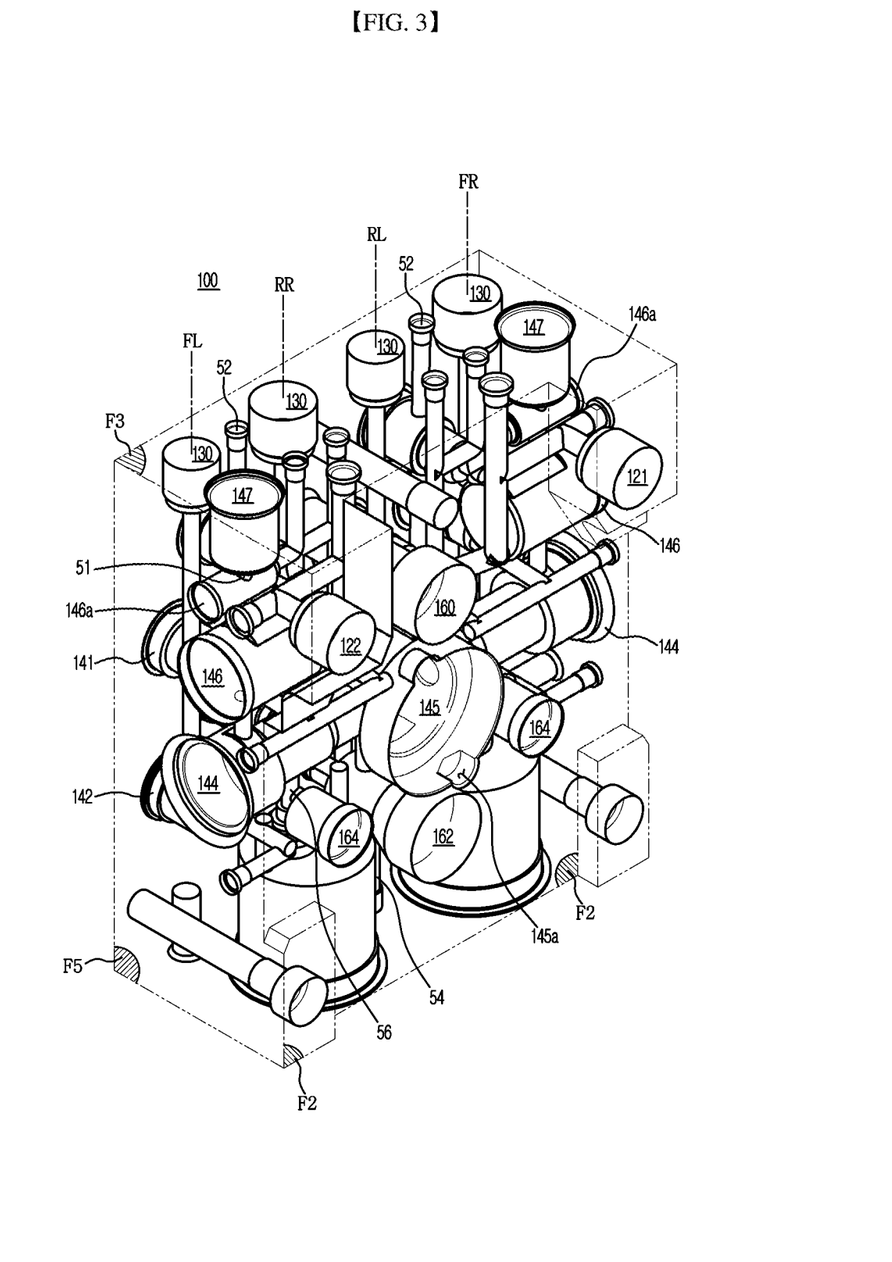
FIG. 3 is a perspective view showing a rear surface of the valve block shown in FIG. 2.

In a valve block 100 provided in the hydraulic brake system as described above, FIG. 2 is a perspective view showing a front surface F1 of the valve block 100 for the hydraulic brake system according to the present embodiment, and FIG. 3 is a perspective view showing a rear surface F2 of the valve block 100 shown in FIG. 2.

Referring to FIGS. 2 and 3, on the front surface F1 of the valve block 100 for the hydraulic brake system, NO valve and the NC valve receiving bores 142 are provided to be open, and driving force control valve receiving bores 148, shuttle valve receiving bores 149, and pressure sensor receiving bores 154 and 155 are provided.

Master cylinder connection portions 121 and 122, a motor receiving bore 145, a motor connector receiving bore 160, vibration damper bores 164 and a leak bore 162 are provided on the rear surface F2 of the valve block 100, and wheel cylinder connection portions 130, and second damping bores 147 in which the second pulsation reduction devices are received are provided on an upper surface F3 of the valve block 100.

Low pressure accumulator receiving bores 143 are provided on a lower surface F4 of the valve block 100, and pump receiving bores 144 in which the piston pumps 44 are received, and first damping bores 146 in which the first pulsation reducing devices are received are provided on opposite side surfaces F5 of the valve block 100.

The front surface F1, rear surface F2, upper surface F3, lower surface F4 and opposite side surfaces F5 indicating directions of the valve block 100 are defined based on the valve block 100 shown in FIG. 1 in order to help understand the present disclosure. However, the present disclosure is not limited thereto, and the surface indicating the direction of the valve block 100 may be changed depending on the position where the valve block 100 is installed. Hereinafter, each component will be described in detail.

The motor receiving bore 145, the motor connector receiving bore 160, and the leak bore 162 are provided to be arranged in a row based on a center line C crossing the upper surface F3 and the lower surface F4. All other components are provided to be symmetrical to each other with respect to the surface in contact with each component based on the center line C.

The NO valve receiving bores 141 receiving the plurality of NO valves, respectively, are arranged to form a first valve row L1, and the NC valve receiving bores 142 receiving the plurality of NC valves, respectively, are arranged to form a second valve row L2. The first and second valve rows L1 and L2 are disposed in parallel in a horizontal direction.

The driving force control valve receiving bores 148 to receive the driving force control valves 48 are positioned above the first valve row L1. That is, a pair of the driving force control valve receiving bores 148 are provided and disposed between the first valve row L1 in which the NO valve receiving bores 141 are arranged and a row in which the wheel cylinder connection portions 130 disposed on the upper surface F3 of the valve block 100 are arranged, in an open state on the front surface F1 of the valve block 100. The pair of driving force control valve receiving bores 148 are disposed on the two hydraulic circuits 40A and 40B, respectively, to be symmetrically to each other with respect to the center line C.

The shuttle valve receiving bores 149 to receive the shuttle valves 49 are disposed between the first and second valve rows L1 and L2. That is, a pair of the shuttle valve receiving bores 149 are provided and disposed between the first valve row L1 in which the NO valve receiving bores 141 are arranged and the second valve row L2 in which the NC valve receiving bores 142 are arranged, in an open state on the front surface F1 of the valve block 100.

The pair of driving force control valve receiving bores 148 and the pair of shuttle valve receiving bores 149 are vertically arranged in one row in a space formed between the wheel cylinder connection portions 130.

Second hydraulic lines 52 are disposed on the rear surface F2 of the valve block 100 to connect the master cylinder connection portions 121 and 122 connected to the master cylinder 20, the driving force control valve receiving bores 148, and the shuttle valve receiving bores 149 to transfer hydraulic pressure.

Also, the second hydraulic lines 52 are disposed between the NO valve receiving bores 141 arranged in the first valve row L1.

When the driving force control valves 48 received in the driving force control valve receiving bores 148 are closed, the braking pressure generated by the operation of the pumps may be transferred to the wheel cylinder of each wheel.

When the shuttle valves 49 received in the shuttle valve receiving bores 149 are opened, oil in the master cylinder 20 is sucked into inlets of the pumps by master cylinder hydraulic lines 16 connecting the shuttle valves 49 and the master cylinder connection portions 121 and 122.

The pressure sensor receiving bores 154 and 155 may include the first pressure sensor receiving bore 154 and the second pressure sensor receiving bore 155. The first and second pressure sensor receiving bores 154 and 155 are disposed adjacent to the pair of low pressure accumulator receiving bores 143. The first pressure sensor receiving bore 154 may be provided as a single one, and the second pressure sensor receiving bore 155 may be provided as a pair. More specifically, the pressure sensor receiving bores 154 and 155 includes the first pressure sensor receiving bore 154 for receiving a pressure sensor provided to detect the hydraulic pressure in the master cylinder 20, and the second pressure sensor receiving bores 155 for receiving pressure sensors provided to detect the hydraulic pressure in the wheel cylinders 30.

The pressure sensor provided to detect the hydraulic pressure in the master cylinder 20 may detect the hydraulic pressure in the master cylinder 20 by detecting the braking pressure transferred to the driving force control valves 48 and the shuttle valves 49.

The second hydraulic lines 52 are formed to penetrate the driving force control valve receiving bores 148 and the shuttle valve receiving bores 149. The at least one second hydraulic line 52 may be connected to the first pressure sensor receiving bore 154 by being connected to any one of the pair of master cylinder connection portions 121 and 122. Accordingly, the hydraulic pressure in the master cylinder connection portions 121 and 122 may be detected in the first pressure sensor receiving bore 154 according to the above-described flow path connection pattern through the second hydraulic line 52.

Fourth hydraulic lines 55 connect the second pressure sensor receiving bores 155 and the NC valve receiving bores 142 arranged in the second valve row L2. The port connection flow paths 35 connect the second pressure sensor receiving bores 155 to the wheel cylinder connection portions 130 to detect the hydraulic pressure in the wheel cylinders 30.

The fourth hydraulic lines 55 and the port connection flow paths 35 are interconnected to penetrate the NO valve receiving bores 141 from some of the plurality of wheel cylinder connection portions 130 and to penetrate the NC valve receiving bores 142 and the lower surface F4 of the valve block 100. Accordingly, the hydraulic pressure in the wheel cylinder connection portions 130 may be detected in the second pressure sensor receiving bores 155 according to the above-described flow path connection pattern, thereby ensuring the operating stability of a brake installation.

The master cylinder connection portions 121 and 122 are formed to be open from the rear surface F2 of the valve block 100 and are disposed at a position adjacent to the upper surface F3 of the valve block 100. Also, a pair of the master cylinder connection portions 121 and 122 are provided and disposed on the two hydraulic circuits 40A and 40B, respectively, to be symmetrically to each other with respect to the center line C.

The motor receiving bore 145 is formed in the rear surface F2 of the valve block 100 to receive the motor 45 for driving the piston pump 44. The motor connector receiving bore 160 receives a motor connector (not shown) for electrical connection with the motor 45.

The motor receiving bore 145 is formed in a gap between the first and second valve rows L1 and L2 and disposed in a space between the pair of shuttle valve receiving bores 149, and is oriented vertically between the pair of pump receiving bores 144 formed on the opposite side surfaces F5 of the valve block 100.

The motor receiving bore 145 includes a sensor bore 163 for detecting the position of the piston in the pump receiving bore 144. The sensor bore 163 receives a converter to convert a position value into a rotation signal or convert the rotation signal into the position value.

The motor connector receiving bore 160 is disposed in a space between the pair of driving force control valve receiving bores 148 above the motor receiving bore 145.

As described above, the motor receiving bore 145 and the motor connector receiving bore 160 are arranged in one row on the center line C crossing the upper surface F3 and the lower surface F4 of the valve block 100.

The leak bore 162 is formed on the rear surface F2 of the valve block 100 and disposed in a space between the pair of low pressure accumulator receiving bores 143 formed on the lower surface F4 of the valve block 100. The leak bore 162 is disposed parallel to the motor connector receiving bore 160.

A third hydraulic line 54 is disposed between the pair of low pressure accumulator receiving bores 143 to connect the leak bore 162 and the pump receiving bore 144.

The leak bore 162 is connected to the motor receiving bore 145 through the third hydraulic line 54 so that oil leaked in the pump receiving bore 144 passes through the motor receiving bore 145 and is introduced into the inside of the leak bore 162. The motor receiving bore 145, the motor connector receiving bore 160 and the leak bore 162 are sequentially arranged on the center line C in a direction from the upper surface F3 to the lower surface F4 of the valve block 100.

The leak bore 162 may be configured as a blind bore. That is, the leak bore 162 may be configured as a blind bore by a sealant applied and bonded to the rear surface F2 during the assembly of the motor 45 and cured, in order to ensure immersion leakage prevention and leakage stability of the hydraulic system.

Because the motor 45 has a relatively higher internal temperature than the valve block 100 when the hydraulic brake system is operated, air existing inside the motor 45 expands. Thereafter, when the driving of the motor 45 is stopped and the internal temperature thereof decreases, the air inside the motor 45 that has been expanded is contracted, so that a phenomenon occurs in which the motor 45 sucks the leaked oil into the inside thereof.

Accordingly, a motor ventilation hole 145a may be provided in the motor receiving bore 145. That is, the motor ventilation hole 145a is formed to reduce a temperature difference between the motor 45 and the valve block 100 and serves to prevent the leaked oil from flowing into the motor 45 due to the temperature difference. For example, when the electronic brake system is operated, the temperature of the motor 45 increases, whereas the valve block 100 has a relatively lower temperature than the motor 45. In this state, when the operation is stopped and the temperature of the motor 45 decreases, the expanded air is contracted so that the leaked oil is sucked into the motor 45. Therefore, by forming the motor ventilation hole 145a to reduce the temperature difference between the contact portions of the motor 45 and the valve block 100, the leaked oil is prevented from being sucked into the motor 45 due to the contracted air. Accordingly, the leaked oil that is not sucked into the motor 45 easily flows into the leak bore 162.

A pair of the vibration damper bores 164 are formed symmetrically to each other on the rear surface F2 of the valve block 100 and are disposed in a space between the pump receiving bores 144 and the low pressure accumulator receiving bores 143.

A fifth hydraulic line 56 connects discharge sides of the low pressure accumulator receiving bores 143 and suction sides of the pump receiving bores 144 to transfer hydraulic pressure.

The vibration damper bore 164 is connected to the fifth hydraulic line 56, and the fifth hydraulic line 56 connects each of the suction sides of the pump receiving bores 144 to the low pressure accumulator receiving bores 143 closest to the suction sides through the vibration damper bore 164.

A sixth hydraulic line 57 connects the NC valve receiving bore 142 and the low pressure accumulator receiving bore 143 to transfer hydraulic pressure.

The second and sixth hydraulic lines 52 and 57 are formed such that the low pressure accumulator receiving bore 143 is connected to the suction side of the pump receiving bore 144 and the NC valve receiving bore 142 in the shortest path, so that components in the valve block 100 may be compactly disposed.

The wheel cylinder connection portion 130 is formed on the upper surface F3 of the valve block 100 to provide hydraulic pressure to the wheel cylinder. The wheel cylinder connection portion 130 is disposed at a position adjacent to the front face F1 of the valve block 100.

A pair of the low pressure accumulator receiving bores 143 are formed symmetrically to each other on the lower surface F4 of the valve block 100 and receive the low pressure accumulators 43 temporarily storing oil exiting from the wheel cylinders.

A pair of the pump receiving bores 144 are formed symmetrically to each other on the opposite side surfaces F5 of the valve block 100 and receive the piston pumps 44. The pump receiving bores 144 are positioned in the gap between the first and second valve rows L1 and L2 and disposed in a horizontal direction with respect to a direction of forming the first and second valve rows L1 and L2.

A pair of the first damping bores 146 are formed symmetrically to each other on the opposite side surfaces F5 of the valve block 100 and receive a first pulsation reducing device. The first damping bores 146 are formed close to the rear surface F2 of the valve block 100 to be disposed in a space between the first valve row L1 and a valve row in which the driving force control valve receiving bores 148 are formed, thereby implementing optimal space utilization.

A pair of the second damping bores 147 are formed symmetrically to each other on the upper surface F3 of the valve block 100 and receive a second pulsation reducing device. The pair of second damping bores 147 are disposed at positions adjacent to the front surface F1 and the opposite side surfaces F5 of the valve block 100.

The orifice bores 146a receive the orifices 46a and are formed as a pair in a mutually symmetrical shape on both sides F5 of the valve block 100. The orifice bores 146a are provided in the space between the first and second damping bores 146 and 147, and are disposed parallel to the first damping bore 146 and disposed to be oriented perpendicular to an axis of the second damping bore 147.

An outlet of the orifice bore 146a is connected to the driving force control valve receiving bore 148, and thus the orifice bore 146a is connected to the first and second damping bores 146 and 147 and at the same time is connected to the driving force control valve receiving bore 148.

The pump receiving bore 144, the first damping bore 146, the second damping bore 147, and the orifice bore 146a are connected by the hydraulic flow path 50 including the first hydraulic line 51.

The first hydraulic line 51 connects a discharge side of the pump receiving bore 144 and a suction side of the first damping bore 146, a discharge side of the first damping bore and the orifice bore, and a bottom surface of the second damping bore in one straight line to transfer hydraulic pressure.

The first damping bore 146 and the second damping bore 147 may be provided to operate under different pressure conditions. That is, the first damping bore 146 and the second damping bore 147 operable under mutually different pressures may be provided to be connected in one straight line on the first hydraulic line 51.

Pressure pulsation generated by the hydraulic pressure discharged from the pump receiving bore 144 is reduced by the first and second damping bores 146 and 147, and then the hydraulic pressure passes through the orifice 46a, so that the pressure pulsation reduction effect may be additionally implemented.

The above-described first hydraulic line 51 is not a flow path separately machined to connect the first and second damping bores 146 and 147 and the orifice bore 146a, but is a flow path required to provide hydraulic pressure to the driving force control valve receiving bore 148 by being connected to the discharge side of the pump receiving bore 144. That is, by excluding the process of machining a separate flow path for the first and second damping bores 146 and 147 and the orifice bore 146a, while the size of the valve block 100 and the structure of the flow path are maintained as in the prior art, the cost or time required for the manufacturing process can be efficiently reduced.

Although the foregoing has illustrated and described a specific embodiment, it should be understood by those of skilled in the art that the present disclosure is not limited to the above-described embodiment, and various changes and modifications may be made without departing from the technical idea of the disclosure described in the following claims.

The invention claimed is:

1. A valve block for a hydraulic brake system comprising:
    a first valve row in which NO valve receiving bores to receive a plurality of NO valves are disposed;
    a second valve row in which NC valve receiving bores to receive a plurality of NC valves are disposed;
    a pair of pump receiving bores formed symmetrically to each other on opposite side surfaces to be disposed between the first and second valve rows and receiving a piston pump;
    a pair of first damping bores formed symmetrically to each other on the opposite side surfaces to be disposed above the first valve row and receiving a first pressure pulsation reducing device;
    a pair of second damping bores formed symmetrically to each other on an upper surface to be disposed above the first damping bores and receiving a second pressure pulsation reducing device;
    a pair of low pressure accumulator receiving bores formed symmetrically to each other on a lower surface;
    a pressure sensor receiving bore formed on a front surface to be disposed adjacent to the pair of low pressure accumulator receiving bores; and
    a first hydraulic pressure line connecting a discharge side of the pump receiving bore and a suction side of the first damping bore, and a discharge side of the first damping bore and a bottom surface of the second damping bore in one straight line to transfer hydraulic pressure.

2. The valve block according to claim 1, further comprising
    orifice bores formed symmetrically to each other on the opposite side surfaces to be disposed between the first damping bores and the second damping bores,
    wherein the first hydraulic pressure line connects the discharge side of the first damping bore, the orifice bore, and the bottom surface of the second damping bore in one straight line to transfer hydraulic pressure.

3. The valve block according to claim 2, further comprising:
    a pair of driving force control valve receiving bores formed symmetrically to each other on the front surface to be disposed above the first valve row; and shuttle valve receiving bores formed symmetrically to each other on the front surface to be disposed between the first valve row and the second valve row, wherein an outlet of the orifice bore is connected to the driving force control valve receiving bore.

4. The valve block according to claim 3, wherein the pair of first damping bore are formed adjacent to a rear surface to be disposed between the first valve row and a valve row in which the pair of driving force control valve receiving bores are formed.

5. The valve block according to claim 4, further comprising
a master cylinder connection portion formed on the rear surface.

6. The valve block according to claim 5, further comprising
a second hydraulic pressure line connecting the master cylinder connection portion, the driving force control valve receiving bore, and the shuttle valve receiving bore to transfer hydraulic pressure,
wherein the second hydraulic line is disposed between the NO valve receiving bores arranged in the first valve row.

7. The valve block according to claim 6, wherein
the second hydraulic line connects the pressure sensor receiving bore and the shuttle valve receiving bore to transfer hydraulic pressure.

8. The valve block according to claim 4, further comprising
a wheel cylinder connection portion formed on the upper surface,
wherein the driving force control valve receiving bore is disposed between the first valve row and a row in which the wheel cylinder connection portion is formed.

9. The valve block according to claim 1, further comprising:
a motor receiving bore formed on a rear surface and in which a motor for driving the piston pump is installed; and
a motor ventilation hole formed in the motor receiving bore,
wherein the motor receiving bore is disposed to be oriented vertically between the pair of pump receiving bores.

10. The valve block according to claim 9, further comprising
a motor connector receiving bore formed on the rear surface and in which a motor connector for driving the piston pump is installed,
wherein the motor connector receiving bore is disposed above the motor receiving bore, and
the motor receiving bore and the motor connector receiving bore are arranged in one line on a center line based on the center line crossing the upper surface and the lower surface.

11. The valve block according to claim 10, further comprising:
a leak bore disposed between the pair of low pressure accumulator receiving bores; and
a third hydraulic line disposed between the pair of low pressure accumulator receiving bores to connect the leak bore and the pump receiving bore.

12. The valve block according to claim 9, wherein
the motor receiving bore comprises a sensor bore to detect the position of a piston in the pump receiving bore, and
the sensor bore is disposed between the first and second valve rows to receive a converter to convert a position value into a rotation signal or convert the rotation signal into the position value.

13. The valve block according to claim 1, wherein
the first damping bore and the second damping bore are provided to operate under different pressure conditions.

14. The valve block according to claim 1, further comprising
a fourth hydraulic line connecting the pressure sensor receiving bore and the NC valve receiving bore to transfer hydraulic pressure,
wherein the fourth hydraulic line is formed to penetrate the lower surface.

15. The valve block according to claim 1, further comprising:
a pair of vibration damper bores formed symmetrically to each other on a rear surface to be disposed between the pump receiving bore and the low pressure accumulator receiving bore; and
a fifth hydraulic line connecting a discharge side of the low pressure accumulator receiving bore and a suction side of the pump receiving bore to transfer hydraulic pressure,
wherein the vibration damper bores are connected to the fifth hydraulic line.

* * * * *